(12) United States Patent
Kim

(10) Patent No.: US 9,228,620 B2
(45) Date of Patent: Jan. 5, 2016

(54) DUAL CLUTCH DEVICE

(75) Inventor: Cheol Jin Kim, Gyeonggi-do (KR)

(73) Assignee: HYUNDAI POWERTECH CO., LTD., Chungcheongnam-Do (KR)

( * ) Notice: Subject to any disclaimer, the term of this patent is extended or adjusted under 35 U.S.C. 154(b) by 0 days.

(21) Appl. No.: 14/235,698

(22) PCT Filed: Sep. 9, 2011

(86) PCT No.: PCT/KR2011/006713
§ 371 (c)(1),
(2), (4) Date: Jan. 28, 2014

(87) PCT Pub. No.: WO2013/018953
PCT Pub. Date: Feb. 7, 2013

(65) Prior Publication Data
US 2014/0209424 A1 Jul. 31, 2014

(30) Foreign Application Priority Data
Jul. 29, 2011 (KR) .......................... 10-2011-0075550

(51) Int. Cl.
| F16D 21/06 | (2006.01) |
| F16D 21/00 | (2006.01) |
| F16D 25/10 | (2006.01) |

(52) U.S. Cl.
CPC .............. *F16D 21/00* (2013.01); *F16D 21/06* (2013.01); *F16D 25/10* (2013.01); *F16D 2021/0661* (2013.01); *F16D 2021/0692* (2013.01)

(58) Field of Classification Search
CPC .............................................. F16D 2021/0692
See application file for complete search history.

(56) References Cited

U.S. PATENT DOCUMENTS
7,121,392 B2 * 10/2006 Braford et al. ............... 192/48.8
2005/0205378 A1   9/2005 Miyazaki et al.

FOREIGN PATENT DOCUMENTS
| JP | 2005-133937 A | 5/2005 |
| JP | 2008-540977 A | 11/2008 |

OTHER PUBLICATIONS

International Search Report dated Jun. 19, 2012 in International Application No. PCT/KR2011/006713.

* cited by examiner

*Primary Examiner* — Ramya Burgess
*Assistant Examiner* — Mark Manley
(74) *Attorney, Agent, or Firm* — Saliwanchik, Lloyd & Eisenschenk

(57) ABSTRACT

The present invention relates to a dual clutch device which comprises: a retainer portion to which a rotation force is transmitted; a pair of plate portions provided to the retainer portion; disc portions which are respectively arranged at the plate portions; a hub portion connected to the disc portion; piston portions which respectively apply pressure to the plate portions; driving portions which respectively move the piston portions; and a restoration portion which is arranged between the driving portions and provides a restoration force to the piston portions. The dual clutch device, according to the invention, uses one restoration portion, thereby simplifying a flow path and reducing the size of a product.

15 Claims, 2 Drawing Sheets

DUAL CLUTCH DEVICE

CROSS-REFERENCE TO RELATED APPLICATIONS

This application is the U.S. national stage application of International Patent Application No. PCT/KR2011/006713, filed Sep. 9, 2011, which claims priority to Korean Application No. 10-2011-0075550, filed Jul. 29, 2011, the disclosures of each of which are incorporated herein by reference in their entirety.

TECHNICAL FIELD

The present invention relates to a dual clutch device, and more particularly, to a dual clutch device capable of using a balance chamber and a return spring in common.

BACKGROUND ART

In general, an automatic transmission uses a planetary gear device as a multiple-stage speed change mechanism which changes the rotation force transferred from an input shaft and transfers changed rotation force to a driving shaft.

The planetary gear device is constructed such that an element serves as an input element and another element serves as a reaction element to transfer speed-changed rotation force to an output element.

In the planetary gear device, in order to allow respective elements to serve as the input element, the reaction element and the output element, a certain element of the planetary gear device is connected by a hydraulically acting friction element, and the hydraulically acting friction element is actuated or deactuated by application or release of a control pressure from a hydraulic control system.

The hydraulically acting friction element is constituted by a clutch which transfers the rotation power of an input shaft and a brake which secures one element of the planetary gear device.

If a hydraulic pressure is supplied to the clutch, a piston is moved and brings multiple clutch plates and multiple clutch disks into close contact.

Since the plates are spline-coupled to a retainer and the disks are spline-coupled to a hub, if the plates and the disks are brought into close contact, the power of the retainer is transferred to the hub.

A balance chamber and a return spring are arranged between the piston and the retainer. Since a lubricant is filled in the balance chamber, centrifugal force in a piston-acting direction by a working fluid may be offset.

Accordingly, if the pressure of the working fluid is released, the piston is returned to its original position by the returning force of the return spring.

Meanwhile, in a dual clutch device, two pistons are used, and a balance chamber and a return spring are provided for each of the two pistons.

The background art of the present disclosure is disclosed in Korean Unexamined Patent Publication No. 10-1996-031833 (published on Sep. 17, 1996 and entitled 'Clutch Assembly Structure of Multiple Disk Clutch').

DISCLOSURE

Technical Problem

A conventional dual clutch device has a problem in that, since a balance chamber and a return spring should be provided for each clutch section, a volume for constructing the device increases and a flow path is complicated.

Therefore, it is necessary to cope with this problem.

An embodiment of the present disclosure relates to a dual clutch device in which clutch sections commonly use a balance chamber and a return spring so that a flow path and a structure may be designed simply.

Technical Solution

In order to achieve the object, the present invention provides a dual clutch device, including a retainer section to which rotation force is transferred; a plate section which is mounted to the retainer section; a disk section which is disposed on the plate section; a hub section which is connected to the disk section; a piston section which presses the plate section; a driving section which moves the piston section; and a returning section which is disposed between parts of the driving section and provides returning force to the piston section.

The retainer section according to a first aspect of the present disclosure includes an input shaft to which rotation force is inputted; a connection part which is connected to the input shaft; a coupling part which is coupled to the connection part; a bent part which is bent from the coupling part; and a mounting part which is coupled to the bent part and to which the plate section is mounted.

The plate section according to the first aspect of the present disclosure includes a plurality of first plates which are mounted to the mounting part; and a plurality of second plates which are mounted to the mounting part and are disposed to be separated from the first plates.

The disk section according to the first aspect of the present disclosure includes first disks which are disposed alternately with the first plates; and second disks which are disposed alternately with the second plates.

The hub section according to the first aspect of the present disclosure includes a first hub to which the first disks are coupled; and a second hub to which the second disks are coupled.

The piston section according to the first aspect of the present disclosure includes a first piston which presses the first plates; and a second piston which presses the second plates.

The driving section according to the first aspect of the present disclosure includes a first actuating plate which has one end which is brought into close contact with the first piston, and which defines a first working space between it and the first piston; a second actuating plate which has one end which is brought into close contact with the second piston, and which defines a second working space between it and the second piston; and a base plate to which the other end of the first actuating plate and the other end of the second actuating plate are connected, and which is defined with a first hole which communicates with the first working space and into and from which a working fluid is introduced and discharged and a second hole which communicates with the second working space and into and from which the working fluid is introduced and discharged.

The returning section according to the first aspect of the present disclosure includes a first returning plate which has one end which is brought into close contact with the mounting part and the other end which is brought into close contact with the first piston; a second returning plate which has one end which is brought into close contact with the mounting part and the other end which is brought into close contact with the second piston; a balance chamber which communicates with a lubricant hole which is defined through the base plate, which is defined between the first returning plate and the second returning plate, and in which a lubricant is filled; and an elastic element which has one end which is supported by the first returning plate and the other end which is supported by the second returning plate, and which provides elastic force by elasticity thereof.

The retainer section according to a second aspect of the present disclosure includes an input shaft to which rotation force is inputted; a connection part which is connected to the input shaft; a first mounting part which is coupled to the connection part; a bent part which is bent from the first mounting part; and a second mounting part which is connected to the bent part and which faces the first mounting part.

The plate section according to the second aspect of the present disclosure includes a plurality of first plates which are mounted to the first mounting part; and a plurality of second plates which are mounted to the second mounting part.

The disk section according to the second aspect of the present disclosure includes first disks which are disposed alternately with the first plates; and second disks which are disposed alternately with the second plates.

The hub section according to the second aspect of the present disclosure includes a first hub to which the first disks are coupled; and a second hub to which the second disks are coupled.

The piston section according to the second aspect of the present disclosure includes a first piston which presses the first plates; and a second piston which presses the second plates.

The driving section according to the second aspect of the present disclosure includes a first actuating plate which has one end which is brought into close contact with the first piston, and which defines a first working space between it and the first piston; a second actuating plate which has one end which is brought into close contact with the second piston, and which defines a second working space between it and the second piston; and a base plate to which the other end of the first actuating plate and the other end of the second actuating plate are connected, and which is defined with a first hole which communicates with the first working space and into and from which a working fluid is introduced and discharged and a second hole which communicates with the second working space and into and from which the working fluid is introduced and discharged.

The returning section according to the second aspect of the present disclosure includes a first returning plate which is mounted to the second mounting part and is brought into close contact with the first piston; a second returning plate which has one end which is brought into close contact with the second mounting part and the other end which is brought into close contact with the second piston; a balance chamber which communicates with a lubricant hole which is defined through the base plate, which is defined between the first returning plate and the second returning plate, and in which a lubricant is filled; and an elastic element which has one end which is supported by the first piston and the other end which is supported by the second returning plate, and which provides elastic force by elasticity thereof.

Advantageous Effects

In the dual clutch device according to the embodiments of the present disclosure, since one balance chamber and one elastic element are commonly used, the design of a flow path may be simplified.

In the dual clutch device according to the embodiments of the present disclosure, since one balance chamber and one elastic element are commonly used, the size of a product may be decreased and a manufacturing cost may be reduced.

DESCRIPTION OF DRAWINGS

The above and other aspects, features and advantages of the present disclosure will become apparent from the following detailed description in conjunction with the accompanying drawings, in which.

BEST MODE

Embodiments of the present disclosure will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the present disclosure into account and can be changed according to the custom or intention of users or operators. Therefore, definition of the terms should be made according to the overall disclosures set forth herein.

Figure 1:
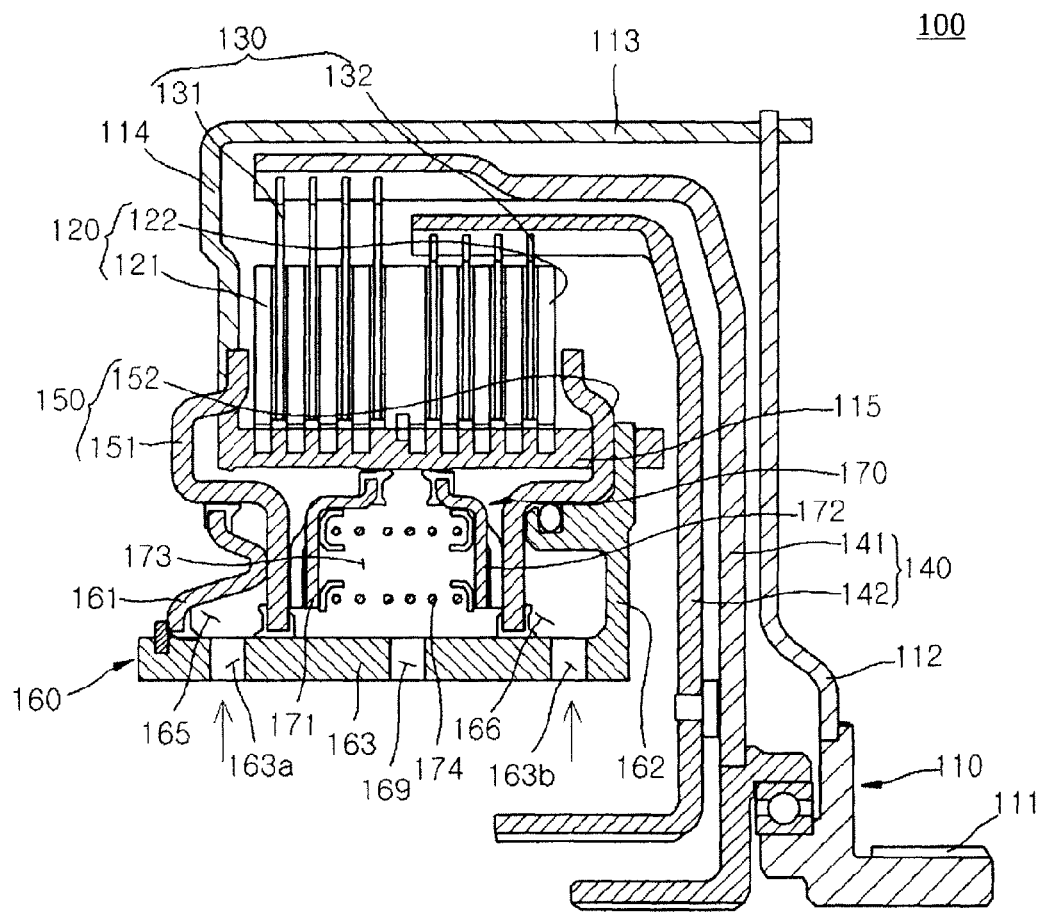
FIG. 1 is a cross-sectional view schematically illustrating a dual clutch device in accordance with a first embodiment of the present disclosure.
Figure 2:
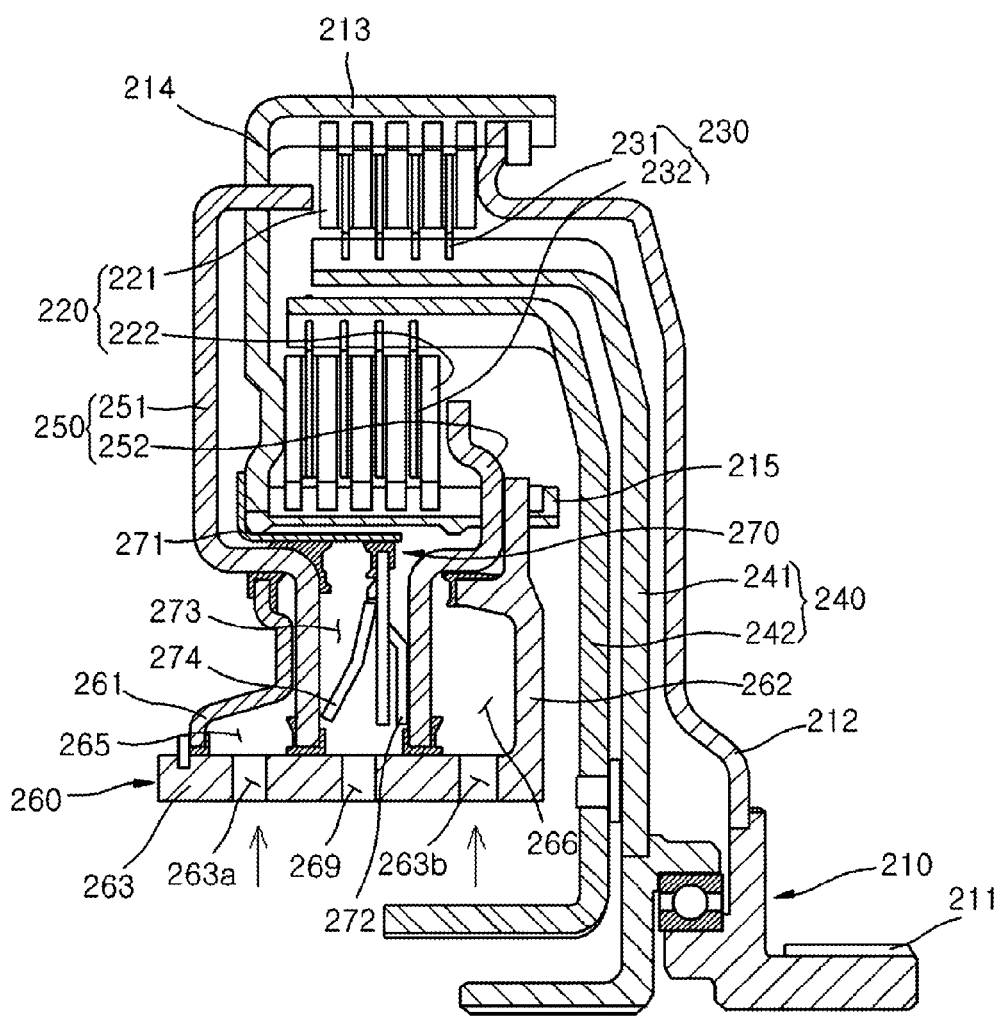
FIG. 2 is a cross-sectional view schematically illustrating a dual clutch device in accordance with a second embodiment of the present disclosure.

FIG. 1 is a cross-sectional view schematically illustrating a dual clutch device in accordance with a first embodiment of the present disclosure, and FIG. 2 is a cross-sectional view schematically illustrating a dual clutch device in accordance with a second embodiment of the present disclosure.

Referring to FIGS. 1 and 2, dual clutch devices 100 and 200 in accordance with a first embodiment and a second embodiment of the present disclosure include retainer sections 110 and 210, plate sections 120 and 220, disk sections 130 and 230, hub sections 140 and 240, piston sections 150 and 250, driving sections 160 and 260, and returning sections 170 and 270.

The retainer sections 110 and 210 are rotated as rotation force is transferred thereto. Each of the plate sections 120 and 220 is disposed as a pair of parts, on each of the retainer sections 110 and 210. The disk sections 130 and 230 are disposed adjacent to the plate sections 120 and 220, and transfer power by close contact of disks. The hub sections 140 and 240 are connected to the disk sections 130 and 230.

Accordingly, if the plates of the plate sections 120 and 220 and the disks of the disk sections 130 and 230 are brought into close contact, the rotation force of the retainer sections 110 and 210 is transferred to the hub sections 140 and 240.

The piston sections 150 and 250 selectively press the plate sections 120 and 220, and bring the plates of the plate sections 120 and 220 and the disks of the disk sections 130 and 230 disposed adjacent to the plate sections 120 and 220, into close contact.

The driving sections 160 and 260 move the respective pistons 150 and 250 by a working fluid, and the returning sections 170 and 270 are disposed between parts of the driving sections 160 and 260 and provide returning force to the piston sections 150 and 250.

A transverse dual clutch device in accordance with the first embodiment of the present disclosure will be described below with reference to FIG. 1.

The retainer section 110 in accordance with the first embodiment of the present disclosure includes an input shaft 111, a connection part 112, a coupling part 113, a bent part 114, and a mounting part 115.

The input shaft 111 is linked with an engine and is transferred with rotation force, and the connection part 112 is connected with the input shaft 111.

The coupling part 113 is coupled to the connection part 112 and is horizontally disposed to extend parallel to the input shaft 111. The bent part 114 is bent vertically from the end of the coupling part 113 and extends downwards.

The mounting part 115 is coupled to the end of the bent part 114 and extends parallel to the coupling part 113. The pair of parts of the plate section 120 are disposed on the mounting part 115 in the lengthwise direction of the mounting part 115.

The plate section 120 in accordance with the first embodiment of the present disclosure includes first plates 121 and second plates 122. The plate section 120 is spline-coupled to the retainer section 110.

A plurality of first plates 121 are mounted to the mounting part 115, and a plurality of second plates 122 are mounted to the mounting part 115 in such a way as to be separated from the first plates 121.

The disk section 130 in accordance with the first embodiment of the present disclosure includes first disks 131 and second disks 132.

The first disks 131 are alternately disposed with the first plates 121, and the second disks 132 are alternately disposed with the second plates 122. The disk section 130 is spline-coupled to the hub section 140.

The hub section 140 in accordance with the first embodiment of the present disclosure includes a first hub 141 and a second hub 142. The hub section 140 transfers the rotation force inputted thereto through the retainer section 110, to an output shaft.

The first disks 131 are coupled to the first hub 141, and the second disks 132 are coupled to the second hub 142. The first hub 141 is disposed inward of the retainer section 110, and the second hub 142 is disposed inward of the first hub 141.

The piston section 150 in accordance with the first embodiment of the present disclosure includes a first piston 151 and a second piston 152.

The first piston 151 functions to press the first plates 121. The first piston 151 has one end which is disposed adjacent to the left side of the first plates 121 and the other end which is bent to extend downward and is positioned below the mounting part 115.

The second piston 152 functions to press the second plates 122. The second piston 152 has one end which is disposed adjacent to the right side of the second plates 122 and the other end which is bent to extend downward and is positioned below the mounting part 115.

The first piston 151 and the second piston 152 are disposed to face each other below the mounting part 115.

The driving section 160 in accordance with the first embodiment of the present disclosure includes a first actuating plate 161, a second actuating plate 162, and a base plate 163.

The first actuating plate 161 has one end which is brought into close contact with the first piston 151. As the first actuating plate 161 has a flexed shape, a portion of the first actuating plate 161 is separated from the first piston 151. Thus, a first working space 165 is defined between the first actuating plate 161 and the first piston 151.

The second actuating plate 162 has one end which is brought into close contact with the second piston 152. As the second actuating plate 162 has a flexed shape, a portion of the second actuating plate 162 is separated from the second piston 152. Thus, a second working space 166 is defined between the second actuating plate 162 and the second piston 152.

The other ends of the first actuating plate 161 and the second actuating plate 162 are connected to the base plate 163. A first hole 163a and a second hole 163b are defined through the base plate 163.

The first hole 163a communicates with the first working space 165 so that the working fluid may be introduced into and discharged from the first working space 165, and the second hole 163b communicates with the second working space 166 so that the working fluid may be introduced into and discharged from the second working space 166.

The returning section 170 in accordance with the first embodiment of the present disclosure includes a first returning plate 171, a second returning plate 172, a balance chamber 173, and an elastic element 174. The returning section 170 is disposed between the first piston 151 and the second piston 152.

The first returning plate 171 has one end which is brought into close contact with the mounting part 115 and the other end which is brought into close contact with the inner surface of the first piston 151.

The second returning plate 172 has one end which is brought into close contact with the mounting part 115 and the other end which is brought into close contact with the inner surface of the second piston 152.

The balance chamber 173 is defined between the first returning plate 171 and the second returning plate 172 and is filled with a lubricant. A lubricant hole 169 is defined through the base plate 163 to communicate with the balance chamber 173, such that the lubricant can be introduced into and discharged from the balance chamber 173.

The elastic element 174 has one end which is supported by the first returning plate 171 and the other end which is supported by the second returning plate 172. The elastic element 174 provides returning force by elasticity thereof.

In order to prevent the working fluid from leaking from the first working space 165 and the second working space 166, seals are provided at the boundary regions of the piston section 150 and the driving section 160. Further, in order to prevent the lubricant from leaking from the balance chamber 173, the returning section 170 is sealed.

Operations of the dual clutch device in accordance with the first embodiment of the present disclosure, constructed as mentioned above, will be described below.

If the working fluid is introduced into the first working space 165 through the first hole 163a, the first piston 151 is moved toward the first plates 121 while pressing the returning section 170 by the hydraulic pressure of the first working space 165.

Because the first plates 121 and the first disks 131 are brought into close contact with each other due to such movement of the first piston 151, the rotation force of the retainer section 110 is transferred to the first hub 141.

The lubricant filled in the balance chamber 173 of the returning section 170 offsets the centrifugal force of the working fluid introduced into the first working space 165. If the introduction of the working fluid into the first working space 165 is interrupted, the first piston 151 is returned to its original position by the returning force of the elastic element 174.

If the working fluid is introduced into the second working space 166 through the second hole 163b, the second piston 152 is moved toward the second plates 122 while pressing the returning section 170 by the hydraulic pressure of the second working space 166.

Because the second plates 122 and the second disks 132 are brought into close contact with each other due to such movement of the second piston 152, the rotation force of the retainer section 110 is transferred to the second hub 142.

The lubricant filled in the balance chamber 173 of the returning section 170 offsets the centrifugal force of the working fluid introduced into the second working space 166. If the introduction of the working fluid into the second working space 166 is interrupted, the second piston 152 is returned to its original position by the returning force of the elastic element 174.

If the lubricant overflows from the balance chamber 173, the lubricant reaches the mounting part 115 through gaps between the piston section 150 and the returning section 170, and cools the plate section 120 and the disk section 130. The lubricant having passed through the gaps between the piston section 150 and the returning section 170 is scattered by centrifugal force, and is evenly distributed over the plate section 120 and the disk section 130.

A longitudinal dual clutch device in accordance with the second embodiment of the present disclosure will be described below with reference to FIG. 2.

The retainer section 210 in accordance with the second embodiment of the present disclosure includes an input shaft 211, a connection part 212, a first mounting part 213, a bent part 214, and a second mounting part 215.

The input shaft 211 is linked with an engine and is transferred with rotation force, and the connection part 212 is connected with the side of the input shaft 211.

The first mounting part 213 is coupled to the connection part 212 and is horizontally disposed to extend parallel to the input shaft 211. The bent part 214 is bent vertically from the end of the first mounting part 213 and extends downwards.

The second mounting part 215 is coupled to the end of the bent part 214 and extends parallel to the first mounting part 213. The first mounting part 213 and the second mounting part 215 are disposed to face each other.

The plate section 220 is disposed on the first mounting part 213 and the second mounting part 215 in the lengthwise directions of the first mounting part 213 and the second mounting part 215.

The plate section 220 in accordance with the second embodiment of the present disclosure includes first plates 221 and second plates 222. The plate section 220 is spline-coupled to the retainer section 210.

A plurality of first plates 221 are mounted to the first mounting part 213, and a plurality of second plates 222 are mounted to the second mounting part 215.

The disk section 230 in accordance with the second embodiment of the present disclosure includes first disks 231 and second disks 232.

The first disks 231 are alternately disposed with the first plates 221, and the second disks 232 are alternately disposed with the second plates 222. The disk section 230 is spline-coupled to the hub section 240.

The hub section 240 in accordance with the second embodiment of the present disclosure includes a first hub 241 and a second hub 242. The hub section 240 transfers the rotation force inputted thereto through the retainer section 210, to an output shaft.

The first disks 231 are coupled to the first hub 241, and the second disks 232 are coupled to the second hub 242. The first hub 241 is disposed inward of the retainer section 210, and the second hub 242 is disposed inward of the first hub 241.

The piston section 250 in accordance with the second embodiment of the present disclosure includes a first piston 251 and a second piston 252.

The first piston 251 functions to press the first plates 221. The first piston 251 has one end which is disposed adjacent to the left side of the first plates 221 and the other end which is bent to extend downward and is positioned below the second mounting part 215.

The second piston 252 functions to press the second plates 222. The second piston 252 has one end which is disposed adjacent to the right side of the second plates 222 and the other end which is bent to extend downward and is positioned below the second mounting part 215.

The first piston 251 and the second piston 252 are disposed to face each other below the second mounting part 215.

The driving section 260 in accordance with the second embodiment of the present disclosure includes a first actuating plate 261, a second actuating plate 262, and a base plate 263.

The first actuating plate 261 has one end which is brought into close contact with the first piston 251. As the first actuating plate 261 has a flexed shape, a portion of the first actuating plate 261 is separated from the first piston 251. Thus, a first working space 265 is defined between the first actuating plate 261 and the first piston 251.

The second actuating plate 262 is brought into close contact with the second piston 252 at a sidewardly projecting portion thereof, and has one end which is coupled to the second mounting part 215. The second actuating plate 262 is separated from the second piston 252. Thus, a second working space 266 is defined between the second actuating plate 262 and the second piston 252.

The other ends of the first actuating plate 261 and the second actuating plate 262 are connected to the base plate 263. A first hole 263a and a second hole 263b are defined through the base plate 263.

The first hole 263a communicates with the first working space 265 so that the working fluid may be introduced into and discharged from the first working space 265, and the second hole 263b communicates with the second working space 266 so that the working fluid may be introduced into and discharged from the second working space 266.

The returning section 270 in accordance with the second embodiment of the present disclosure includes a first returning plate 271, a second returning plate 272, a balance chamber 273, and an elastic element 274. The returning section 270 is disposed between the first piston 251 and the second piston 252.

The first returning plate 271 is mounted to the second mounting part 215 and is brought into close contact with the inner surface of the first piston 251.

The second returning plate 272 has one end which is brought into close contact with the second mounting part 215 and the other end which is brought into close contact with the inner surface of the second piston 252. The second returning plate 272 may have one end which is brought into close contact with the first returning plate 271.

The balance chamber 273 is defined among the first returning plate 271, the second returning plate 272 and the first piston 251, and is filled with a lubricant. A lubricant hole 269 is defined through the base plate 263 to communicate with the balance chamber 273, such that the lubricant can be introduced into and discharged from the balance chamber 273.

The elastic element 274 has one end which is supported by the first piston 251 and the other end which is supported by the second returning plate 272. The elastic element 274 provides returning force by elasticity thereof.

In order to prevent the working fluid from leaking from the first working space 265 and the second working space 266, seals are provided at the boundary regions of the piston section 250 and the driving section 260. Further, in order to prevent the lubricant from leaking from the balance chamber 273, the returning section 270 is sealed.

Operations of the dual clutch device in accordance with the second embodiment of the present disclosure, constructed as mentioned above, will be described below.

If the working fluid is introduced into the first working space 265 through the first hole 263a, the first piston 251 is moved toward the first plates 221 while pressing the returning section 270 by the hydraulic pressure of the first working space 265.

Because the first plates 221 and the first disks 231 are brought into close contact with each other due to such movement of the first piston 251, the rotation force of the retainer section 210 is transferred to the first hub 241.

The lubricant filled in the balance chamber 273 of the returning section 270 offsets the centrifugal force of the working fluid introduced into the first working space 265. If the introduction of the working fluid into the first working space 265 is interrupted, the first piston 251 is returned to its original position by the returning force of the elastic element 274.

If the working fluid is introduced into the second working space 266 through the second hole 263b, the second piston 252 is moved toward the second plates 222 while pressing the returning section 270 by the hydraulic pressure of the second working space 266.

Since the second plates 222 and the second disks 232 are brought into close contact with each other by such a movement of the second piston 252, the rotation force of the retainer section 210 is transferred to the second hub 242.

The lubricant filled in the balance chamber 273 of the returning section 270 offsets the centrifugal force of the working fluid introduced into the second working space 266. If the introduction of the working fluid into the second working space 266 is interrupted, the second piston 252 is returned to its original position by the returning force of the elastic element 274.

When the lubricant overflows from the balance chamber 273, the lubricant reaches the second mounting part 215 through the gaps between the piston section 250 and the returning section 270, thus cooling the plate section 220 and the disk section 230. Here, the lubricant passing through the gaps between the piston section 250 and the returning section 270 is scattered by the centrifugal force, thus uniformly reaching the plate section 220 and the disk section 230.

Although some embodiments have been provided to illustrate the present disclosure in conjunction with the drawings, it will be apparent to those skilled in the art that the embodiments are given by way of illustration only, and that various modifications and equivalent embodiments can be made without departing from the spirit and scope of the present disclosure. The scope of the present disclosure should be limited only by the accompanying claims.

The invention claimed is:

1. A dual clutch device comprising:
a retainer section to which rotation force is transferred;
a plate section which is mounted to the retainer section;
a disk section which is disposed on the plate section;
a hub section which is connected to the disk section;
a piston section which presses the plate section;
a driving section which moves the piston section; and
a returning section which is disposed between parts of the driving section and provides returning force to the piston section;
wherein the piston section comprises:
a first piston; and
a second piston;
wherein the returning section comprises:
a first returning plate having one end in contact with the first piston;
a second returning plate having one end in contact with the second piston;
a balance chamber defined between the first returning plate and the second returning plate; and
an elastic element having one end supported by the first piston and another end supported by the second returning plate, the elastic element providing elastic force by elasticity.

2. The dual clutch device according to claim 1, wherein the retainer section comprises:
an input shaft to which rotation force is inputted;
a connection part which is connected to the input shaft;
a coupling part which is coupled to the connection part;
a bent part which is bent from the coupling part; and
a mounting part which is coupled to the bent part and to which the plate section is mounted.

3. The dual clutch device according to claim 2, wherein the plate section comprises:
a plurality of first plates which are mounted to the mounting part; and
a plurality of second plates which are mounted to the mounting part and are disposed to be separated from the first plates.

4. The dual clutch device according to claim 3, wherein the disk section comprises:
first disks which are disposed alternately with the first plates; and
second disks which are disposed alternately with the second plates.

5. The dual clutch device according to claim 4, wherein the hub section comprises:
a first hub to which the first disks are coupled; and
a second hub to which the second disks are coupled.

6. The dual clutch device according to claim 5, wherein the first piston presses the first plates; and
the second piston presses the second plates.

7. The dual clutch device according to claim 6, wherein the driving section comprises:
a first actuating plate which has one end which is brought into close contact with the first piston, and which defines a first working space between it and the first piston;
a second actuating plate which has one end which is brought into close contact with the second piston, and which defines a second working space between it and the second piston; and
a base plate to which the other end of the first actuating plate and the other end of the second actuating plate are connected, and which is defined with a first hole which communicates with the first working space and into and from which a working fluid is introduced and discharged and a second hole which communicates with the second working space and into and from which the working fluid is introduced and discharged.

8. The dual clutch device according to claim 7, wherein the first returning plate has one end which is brought into close contact with the mounting part and the other end which is brought into close contact with the first piston;
the second returning plate has one end which is brought into close contact with the mounting part and the other end which is brought into close contact with the second piston;
the balance chamber communicates with a lubricant hole which is defined through the base plate, which is defined between the first returning plate and the second returning plate, and in which a lubricant is filled; and the elastic element has one end which is supported by the first returning plate and another end which is supported by the second returning plate, and provides elastic force by elasticity thereof.

9. The dual clutch device according to claim 1, wherein the retainer section comprises:

an input shaft to which rotation force is inputted;
a connection part which is connected to the input shaft;
a first mounting part which is coupled to the connection part;
a bent part which is bent from the first mounting part; and
a second mounting part which is connected to the bent part and which faces the first mounting part.

10. The dual clutch device according to claim 9, wherein the plate section comprises:

a plurality of first plates which are mounted to the first mounting part; and
a plurality of second plates which are mounted to the second mounting part.

11. The dual clutch device according to claim 10, wherein the disk section comprises:

first disks which are disposed alternately with the first plates; and
second disks which are disposed alternately with the second plates.

12. The dual clutch device according to claim 11, wherein the hub section comprises:

a first hub to which the first disks are coupled; and
a second hub to which the second disks are coupled.

13. The dual clutch device according to claim 12, wherein the piston section comprises:

a first piston which presses the first plates; and
a second piston which presses the second plates.

14. The dual clutch device according to claim 13, wherein the driving section comprises:

a first actuating plate which has one end which is brought into close contact with the first piston, and which defines a first working space between it and the first piston;
a second actuating plate which has one end which is brought into close contact with the second piston, and which defines a second working space between it and the second piston; and
a base plate to which the other end of the first actuating plate and the other end of the second actuating plate are connected, and which is defined with a first hole which communicates with the first working space and into and from which a working fluid is introduced and discharged and a second hole which communicates with the second working space and into and from which the working fluid is introduced and discharged.

15. The dual clutch device according to claim 14, wherein the returning section comprises:

a first returning plate which is mounted to the second mounting part and is brought into close contact with the first piston;
a second returning plate which has one end which is brought into close contact with the second mounting part and the other end which is brought into close contact with the second piston;
a balance chamber which communicates with a lubricant hole which is defined through the base plate, which is defined between the first returning plate and the second returning plate, and in which a lubricant is filled; and
an elastic element which has one end which is supported by the first piston and another end which is supported by the second returning plate, and which provides elastic force by elasticity thereof.

* * * * *